United States Patent [19]

Schmidt

[11] Patent Number: 4,804,352

[45] Date of Patent: Feb. 14, 1989

[54] LINK-TYPE ROTARY COUPLING

[75] Inventor: Warren E. Schmidt, Erie, Pa.

[73] Assignee: Lord Corporation, Erie, Pa.

[21] Appl. No.: 9,312

[22] Filed: Jan. 30, 1987

[51] Int. Cl.$^4$ ............... B64C 27/35; F16D 3/28; F16D 3/30

[52] U.S. Cl. .................. 464/17; 384/221; 416/134 A; 464/69; 464/81; 464/106; 464/904

[58] Field of Search .............. 384/220, 221; 416/134 R, 134 A, 141 R; 464/17, 69, 71, 81, 85, 90, 93, 94, 96, 106, 138, 904

[56] References Cited

U.S. PATENT DOCUMENTS

| | | | |
|---|---|---|---|
| 1,316,903 | 9/1919 | Kuentzel | 464/69 |
| 1,424,051 | 7/1922 | Wayne | 464/69 X |
| 1,636,692 | 7/1927 | Hill | 464/69 |
| 1,752,138 | 3/1930 | Ainsworth | 464/69 |
| 1,894,507 | 1/1933 | Ainsworth | 464/69 |
| 2,292,675 | 8/1942 | Thiry | 464/69 X |
| 2,837,901 | 6/1958 | Chapman | 464/69 |
| 3,257,826 | 6/1966 | Peterson | 464/85 |
| 3,282,350 | 11/1966 | Kisovec | 416/134 A X |
| 3,679,197 | 7/1972 | Schmidt | 416/141 R X |
| 3,804,552 | 4/1974 | Covington | 416/134 A |
| 4,040,270 | 8/1977 | Chivari | 464/69 |
| 4,051,784 | 10/1977 | Ries | 105/131 |
| 4,575,358 | 3/1986 | Ferris | 464/90 |
| 4,588,388 | 5/1986 | Chivari | 464/69 |
| 4,705,489 | 11/1987 | Haarmann et al. | 464/69 |
| 4,729,753 | 3/1988 | Neathery et al. | 464/71 |

FOREIGN PATENT DOCUMENTS

| | | | |
|---|---|---|---|
| 1213680 | 3/1966 | Fed. Rep. of Germany | 464/71 |
| 2920074 | 5/1979 | Fed. Rep. of Germany . | |
| 781797 | 8/1957 | United Kingdom | 464/71 |
| 794072 | 4/1958 | United Kingdom | 464/71 |

Primary Examiner—Daniel P. Stodola
Attorney, Agent, or Firm—Howson and Howson

[57] ABSTRACT

A link-type coupling particularly suited for use in connecting a drive shaft to a rotor hub in an aircraft for permitting the hub to rotate about an axis that may be angularly misaligned with respect to the rotational axis of the drive shaft. The coupling includes a series of links arranged tangentially with respect to the hub and shaft and connected thereto by laminated elastomeric bearings at the ends of the links. The laminated elastomeric bearings accommodate the motion of each link while transferring torque between the shaft and hub.

32 Claims, 5 Drawing Sheets

LINK-TYPE ROTARY COUPLING

FIELD OF THE INVENTION

The present invention relates to rotary mechanical couplings, and more particularly, the present invention relates to such couplings of the type which include a plurality of links connected between drive and driven members for transferring torque from one to the other while accommodating misalignment between their rotational axes.

BACKGROUND OF THE INVENTION

The proposed development of an aircraft designed to take off and fly in either a helicopter mode or an airplane mode has created certain problems. In one proposed form of such aircraft, a pair of powerplants driving a pair of rotor systems are mounted to wings outboard of the aircraft fuselage for pivotal motion with respect to the wings. This enables the rotor systems to rotate in a substantially horizontal plane for take-off and to rotate in a substantially vertical plane for propelling the aircraft.

When operating in a helicopter mode, the plane of the rotor system must be allowed to tilt as much as 10 degrees with respect to a vertical axis under the influence of cyclic blade pitch changes in order either to achieve horizontal flight, or to fly in the airplane mode or to maintain a static hover position in a substantial wind velocity. While many helicopters have been designed with articulated blades which flap to obtain rotor plane tilt, a more efficient design involves mounting the rotor system on a drive shaft gimbal. However, this requires the rotor system to maintain a forward tilt of up to about 10 degrees even though the drive shaft may be rotating about a vertical axis at speeds of 400 rpm. While spherical elastomeric bearings can be used as gimbals to carry thrust and radial loads, they are too soft torsionally to transmit the large torque loads required to drive the rotor system while accommodating the constant 10 degree nutating motion resulting from the misalignment of the rotor system relative to the powerplant shaft.

It is also known that in tilt rotor aircraft, gyroscopic precession forces are created as the rotating rotor systems pivot. Such forces, if transmitted to the powerplant shaft, can impose substantial stresses on the shaft as well as ancillary powerplant mounting structures. These forces may also cause the hub to which the rotor system is mounted to be misaligned with respect to the rotational axis of the powerplant drive shaft, and such misalignment must be accommodated while transferring substantial torque from the drive shaft to the rotor system, i.e. in excess of 4000 horsepower.

One proposal to solve the aforementioned misalignment problem included the use of a coupling between the powerplant shaft and rotor system hub. In such a coupling, a plurality of laminated elastomeric bearing assemblies were mounted at peripherally spaced locations in a solid plate which was connected between angularly offset spider arms secured to the shaft and hub. The thus-described structure was intended to provide sufficient flexibility as to permit the spider arms to transmit torque while rotating about misaligned axes. The use of such a coupling to solve the aforementioned rotor-mounting problem was not satisfactory because of its size, weight and grossly inadequate service life.

Another problem incident to tilt rotor aircraft such as described above is the need for torque to be transmitted from the powerplant shaft to the rotor system hub in a substantially constant velocity manner. In other words, a constant velocity condition exists between drive and driven members when each degree of angular displacement of the powerplant drive shaft induces exactly the same amount of angular displacement in the driven rotor system hub irrespective of the magnitude of misalignment between their rotational axes. Absence of a constant velocity relation between drive and driven members not only creates undesirable stresses within the coupling, but also results in undesirable vibrations in the rotor system and aircraft. These problems have long plagued mechanical link-type couplings, particularly when used to transmit torque between significantly misaligned rotational axes, such as the amount referenced above.

In the aforedescribed aircraft propulsion system, the rotors normally rotate unidirectionally. As a result, couplings are required to transmit torque primarily in only one direction of rotation. For various reasons, however, such as under conditions of autorotation created by powerplant failure, it is important for such an aircraft coupling to be able to accommodate transient reverse torque conditions, thereby imposing yet another design requirement on the capability of the coupling.

In addition to the aforementioned requirements, it is important for the rotor system coupling to be compact, lightweight and easy to maintain. Such a coupling must also have a predictable service life, operate satisfactorily without requiring lubrication, and produce visual evidence of wear long before anticipated replacement intervals. Moreover, such a coupling must be relatively simple in design, rugged, and easy to manufacture utilizing available aerospace manufacturing technologies.

BRIEF DESCRIPTION OF PRIOR ART

As mentioned above, the conventional link-type mechanical coupling includes a drive spider having a plurality of radial arms connected to a drive shaft and a juxtaposed driven spider of like construction arranged with their arms in angularly offset relation. The tips of the arms are interconnected by flexible links disposed generally tangentially between the spiders with the leading ends of the links connected to the drive spider arms and the trailing ends thereof connected to the driven spider arms. As the spiders rotate about misaligned intersecting axes, the links accommodate the kinematics of the coupling.

U.S. Pat. Nos. 1,316,903; 1,424,051; and 1,636,692 are illustrative of link-type couplings of the aforedescribed type which utilize flexible links to accommodate the aforementioned motion. Similar couplings utilizing rigid links connected to the spider arms by rubber bushings at the ends of the links are disclosed in U.S. Pat. Nos. 1,752,138; 1,894,507; 2,292,675; 2,837,901; 4,040,270; 4,051,784; and 4,588,388. Of these couplings, some utilize metal ball and rubber socket bushings.

In the majority of known link-type couplings, the links are connected to their respective spider arms by fasteners extending generally along the rotational axis of the member to which the link is connected. In German published application No. 29 20 074 to Freudenberg, however, the links are connected by bolts extending transversely with respect to the rotational axes of the members coupled. U.S. Pat. No. 3,257,826, owned by the assignee of the present application, discloses a heavy duty flexible shaft coupling which includes laminated elastomeric elements mounted between confronting radial arms. The coupling can accommodate unidirectional torque transfer at shaft misalignment angles of up to two degrees. It is not designed to accommodate reverse torque operating conditions such as required in the aforementioned aircraft application. U.S. Pat. No. 4,575,358 discloses a ball and socket type hub assembly utilizing laminated elastomeric bearings to accommodate movement of a rotor system relative to a powerplant drive shaft.

While each of the aforedescribed patented couplings may function satisfactorily for its intended purpose, there is not currently available a coupling capable of meeting the aforedescribed conditions imposed in connecting a rotor system to a powerplant in a manner permitting the rotor system to rotate about an axis inclined at a substantial angle with respect to the powerplant shaft axis while ensuring a constant velocity relation between the powerplant shaft and the rotor system hub when operating under conditions of substantial misalignment.

OBJECTS OF THE INVENTION

With the foregoing in mind, a primary object of the present invention is to provide a novel heavy duty constant velocity coupling particularly suited for use in connecting a rotor hub to a powerplant drive shaft in an aircraft.

Another object of the present invention is to provide an improved mechanical coupling capable of transmitting motion under conditions of high torque and substantial misalignment between driving and driven members while maintaining a constant velocity relation therebetween.

A further object of the present invention is to provide a heavy duty constant velocity coupling capable of transmitting torque in any direction of rotation.

Yet another object of the present invention is to provide a compact, lightweight, mechanical link-type coupling which is capable of transmitting high torque over a predictable service life while permitting periodic visual inspection for signs of premature wear.

The present invention also provides a unique method of establishing a constant velocity coupling between members rotatable about misaligned axes without requiring any lubrication in the coupling.

SUMMARY OF THE INVENTION

More specifically, the present invention provides an improved, heavy duty, link-type coupling particularly suited for connecting rotor systems to drive shafts in aircraft, but also capable of being utilized in other applications where torque must be transmitted under conditions of constant velocity between members rotatable about misaligned intersecting axes. The coupling comprises a drive member adapted to be connected to a shaft, a driven member mounted adjacent to the end of the shaft for rotation about an axis which may be misaligned with respect to the shaft axis, and a plurality of links drivingly interconnecting the drive and driven members. Each link is axially stiff to accommodate tension and compression loads and has its leading end connected to the drive member and its trailing end connected to the driven member for motion tangentially in an annular path. The ends of each link are provided with spherical elastomeric bearings which are connected by attachment means to the drive and driven members in a manner permitting the link to oscillate about several axes while accommodating such motion substantially entirely in elastic shear and elastic compression. Preferably, the elastomeric bearings are of like construction and each has a spherical array of alternating layers of elastomeric material and relatively nonextensible material bonded together and to the link and its attachment means. When mounted in the coupling, the links are arranged with their bearing attachment axes disposed transversely with respect to the rotational axis of their respective connected members. The coupling of the present invention operates to provide a constant velocity relation by a method wherein each link is free to oscillate while its bearings are subjected substantially entirely to elastic shear and compression strains distributed among bonded laminated layers as the links advance endwise in a tangential path and are subjected to alternating balanced internal compressive and tensile forces that cooperate to ensure a constant velocity relation between the drive and driven members.

BRIEF DESCRIPTION OF THE DRAWINGS

The foregoing and other objects, features and advantages of the present invention should become apparent from the following description, when taken in conjunction with the accompanying drawings, in which.

DESCRIPTION OF THE PREFERRED EMBODIMENTS

Figure 1:
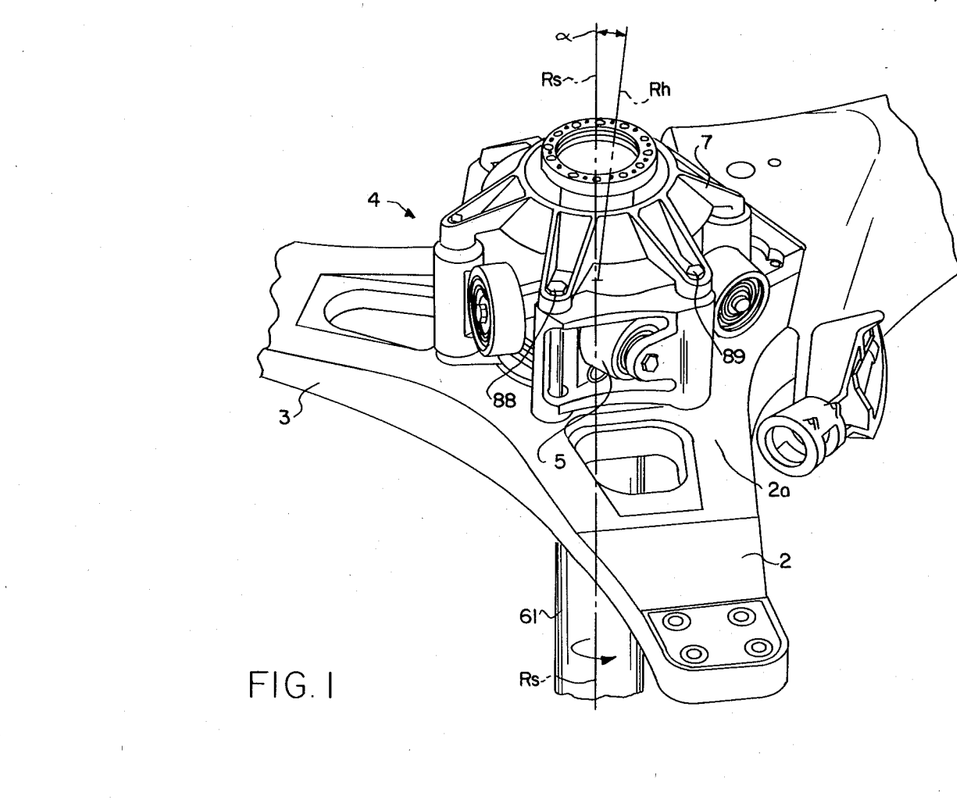
FIG. 1 is a fragmentary perspective view illustrating a rotor system for an aircraft which represents one application wherein a mechanical coupling embodying the present invention finds utility.

Referring now to the drawings, FIG. 1 illustrates one application wherein a link-type coupling embodying the present invention finds particular utility. In the application, a plurality of rotors, or propeller blades, (not shown) are connected to a like plurality of hub arms, such as the arm 2, by any suitable means, as well known in the art. The hub arms, such as the arm 2, are preferably formed integral with a hub 3 which is adapted to be connected to a powerplant shaft 61 by a coupling 4 embodying the present invention.

As will be discussed more fully hereinafter, the coupling 4 includes a plurality of links, such as the link 5, for transferring torque under constant velocity conditions between the powerplant drive shaft and the rotor hub 3 while permitting the hub 3 to rotate about an axis $R_h$ misaligned at an angle $\alpha$ with respect to the rotational axis $R_s$ of the powerplant drive shaft. Axial thrust loads are carried by a pair of conventional elastomeric bearings (not shown) such as the upper elastomeric bearing contained within the upper bearing housing 7. As a result, the coupling of the present invention is particularly well suited for accommodating a substantial tilt of a rotor hub relative to its powerplant drive shaft in an aircraft.

Figure 3:
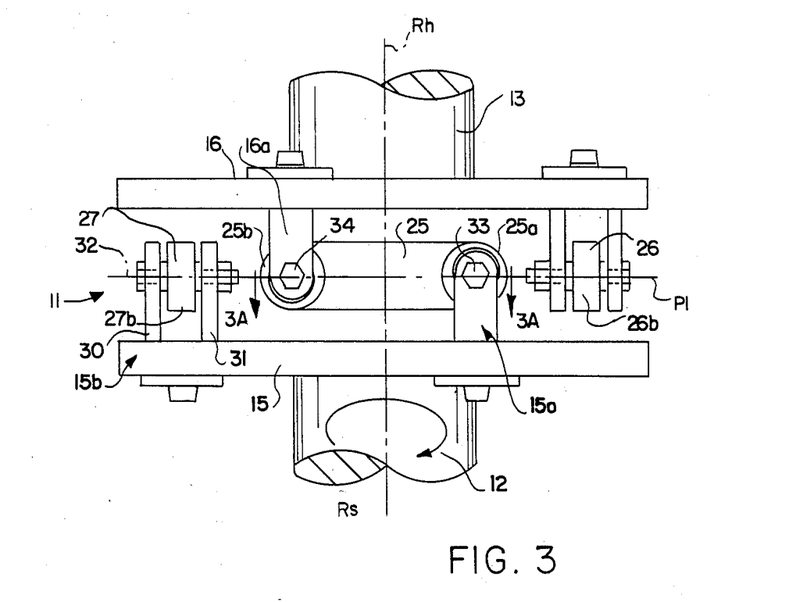
FIG. 3 is a simplified illustration of a coupling of the present invention showing the disposition of various components when used to connect axially aligned shafts.
Figure 4:
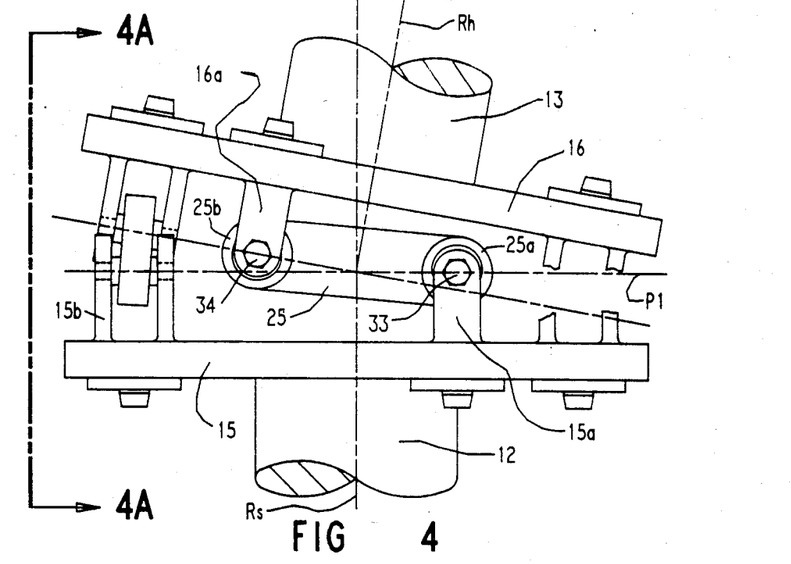
FIG. 4 is a view similar to FIG. 3 but illustrating the disposition of selected coupling components when the rotational axes of the shafts are misaligned with respect to one another.

Before discussing in detail the construction of the coupling 4 illustrated in FIG. 1, reference is made to a simplified embodiment of the coupling which is illustrated in FIGS. 3 and 4 as an aid in explaining certain aspects of structure and function of the present invention.

Figure 3A:
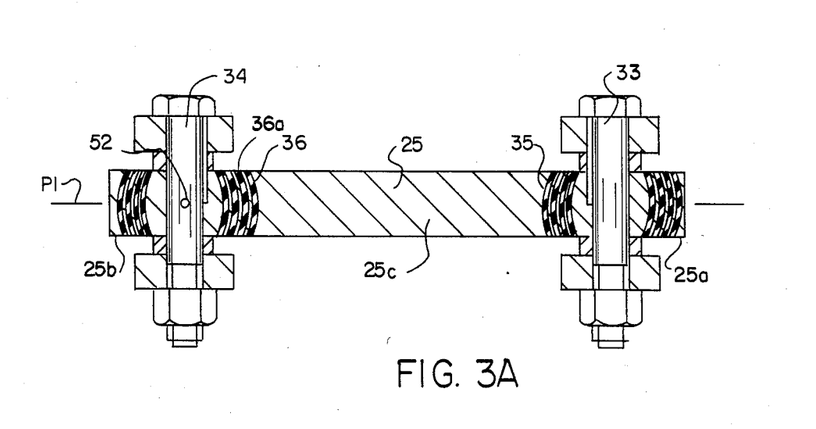
FIG. 3A (sheet 3) is a longitudinal sectional view taken on line 3A—3A of FIG. 3 to illustrate details of construction of a preferred link.

Referring now to FIG. 3, the coupling 11 is shown connecting a drive shaft 12 rotatable about a vertical axis $R_s$ to a driven shaft 13 rotatable about an axis $R_h$ which may, as illustrated in FIG. 3, be coaxial with the axis $R_s$ of the drive shaft 12. A drive member, or hub, 15 is secured to the input drive shaft 12 by conventional means (not shown) such as bolts, weldments, splines, keys, or the like. A hub 16 is similarly connected to the output shaft 13. In the illustrated embodiment, the hubs 15 and 16 include flat circular plates; however, it should be understood that the hubs 15 and 16 may include conventional spiders having arms extending radially outward from the shafts 12 and 13 in angularly offset relation in a plane orthogonal to the shaft rotational axes such as in a plane extending on the line 3A—3A of FIG. 3 orthogonal to the drive shaft axis $R_s$.

To accommodate angular misalignment between the rotational axis $R_s$ of the drive shaft 12 and the rotational axis $R_h$ of the driven shaft 13, such as the misalignment angle $\alpha$ (FIG. 4) a plurality of connecting links are disposed between the hubs 15 and 16 and are interconnected therewith. As best seen in FIG. 3, each link such as the link 25, has a leading end 25a and a trailing end 25b, the ends being defined with respect to the direction of rotation of the input shaft 12 as indicated in FIG. 3. In the illustrated embodiment, four such links are provided between the hubs 15 and 16, the trailing end 26b of a leading link 26 being illustrated to the right of the link 25 in FIG. 3, and the leading end 27a of a trailing link 27 being illustrated to the left of the link 25 in FIG. 3. The fourth link is not shown but is located immediately behind the link 25 shown in the foreground in FIG. 3. While a four link coupling 11 is illustrated in FIGS. 3 and 4, it should be understood that various numbers of links may be utilized, depending upon design parameters, including spatial and loading requirements, and the like, but at least three links spaced apart equiangularly are required to ensure a constant velocity driving relation between the shafts 12 and 13 when misaligned.

Each link, such as the link 25, has its leading end portion 25a connected to the drive hub 15, as by a clevis 15a connected to the drive hub 15, and has its trailing end portion connected to the driven hub 16 as by a clevis 16a connected to the driven hub 16. The drive hub clevis 15a is located radially outward of the rotational axis $R_s$ of the input shaft 12 and hub 15 and extends axially with respect to the plane of the hub 15. In like manner, the clevis 16a is located radially outward with respect to the rotational axis $R_h$ of the output shaft 13 and hub 16 and extends axially with respect to the plane of the hub 16. Thus, the clevises 15a and 16a are disposed in spaced confronting relation with respect to one another but are angularly offset in a horizontal plane passing through their paths of movement orthogonal to the rotational axis $R_s$ in FIG. 3.

As best seen in FIG. 3, each clevis, such as the clevis 15b mounting the link 27, includes a pair of upstanding trunnions 30 and 31 mounted to the drive hub 15 in spaced relation for receiving the end portion of the link 27 therebetween. A connecting bolt 32 extends through the trunnions 30 and 31 and transversely through the link 27. The link 25 is connected by bolts 33 and 34 to its associated clevises 15a and 16a, respectively.

Figure 4A:
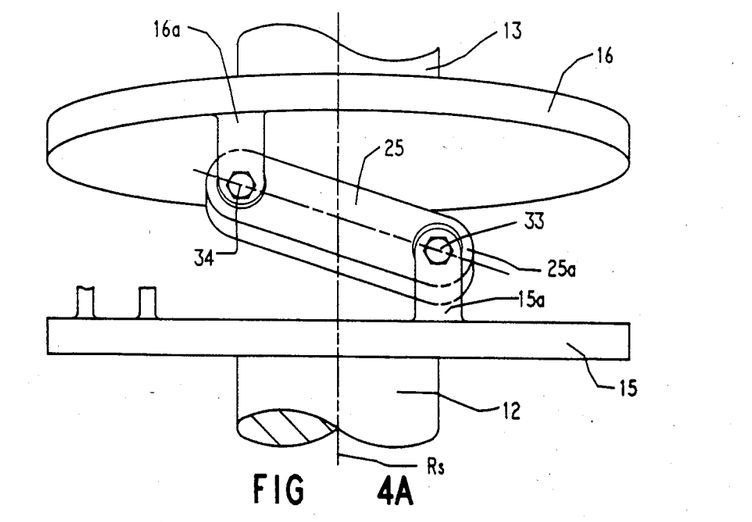
FIG. 4A is a sectional view taken on line 4A—4A of FIG. 4 to illustrate the position of a link when the shafts are misaligned as illustrated in FIG. 4.

With the rotational axes of the shafts 12 and 13 aligned, i.e. arranged coaxially as illustrated in FIG. 3, the links, such as the link 25, of the coupling 11 advance endwise in a plane orthogonal to the rotational axis $R_s$ of the aligned shafts 12 and 13. However, when the shaft 13 is misaligned with respect to the shaft 12, such as when it is displaced through the angle $\alpha$ as illustrated in FIG. 4, and the shafts 12 and 13 rotate, the links move in a complex manner when transmitting torque in a constant velocity manner between the input drive hub 15 and the output drive hub 16. For instance, when the shafts 12 and 13 are aligned as illustrated in FIG. 3, the link 25 advances endwise tangentially of the axis $R_s$ substantially coplanar with the plane $P_1$ orthogonal to the shaft rotational axis $R_s$. However, when the output hub 16 and its shaft 13 are offset angularly, such as illustrated in FIG. 4, the leading end portion of the link 25a remains substantially in the plane $P_1$, but the trailing end portion 25b thereof is cyclically displaced axially above and below the plane $P_1$ when rotated such as illustrated in FIG. 4A. Such trailing end displacement causes a change in distance between the bolts 33 and 34 which must be accommodated dynamically by the links in order to ensure a constant velocity connection between the hubs 15 and 16, and such change in distance occurs twice during each revolution.

In order to transmit torque while accommodating the aforementioned link motion, each link, such as the link 25, is provided with a first or leading end elastomeric bearing means 35 mounted in its leading end portion 25a and a second trailing end elastomeric bearing means 36 mounted in its trailing end portion 25b. See FIG. 3A. Between the elastomeric bearings 35 and 36, the link 25 has a body 25c which is axially, flexurally and torsionally stiff. In other words, in this zone the link body 25c resists flexural and torsional deflection and axial deflections caused by tensile and compressive loads. To this end, the link body 25c is preferably fabricated of strong lightweight metal, such as titanium, aluminum, or the like, but it may be of other strong lightweight materials, including composites in those applications admitting of such materials.

Figure 7:
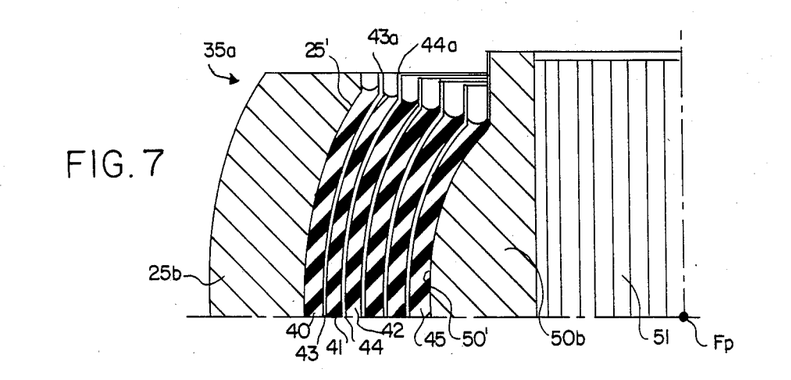
FIG. 7 is a greatly enlarged fragmentary sectional view of a portion of the spherical elastomeric bearing mounted in the link of FIG. 5.

In the preferred embodiment illustrated, the trailing end elastomeric bearing means 36 comprises a laminated spherical component 36a surrounding the connecting bolt 34. The laminated elastomeric bearing 35 at the opposite end of the link 25 is preferably of like construction. As best seen in FIG. 7, each elastomeric bearing includes a series of layers of homogenous elastomeric material of uniform thickness, such as the layers 40, 41 and 42 bonded to and separated by a series of concave relatively inelastic, or non-extensible, members, such as metal shims, 43, 44 bonded to and between the layers 40 and 42, respectively. The outermost elastomeric layer 40 is bonded to a spherical concave surface 25' formed integral within the end portion of the body 25c of the link 25 as by milling. The innermost elastomeric layer 45 is bonded to a convex spherical surface 50' provided on a first attachment means, or inner sleeve, 50b which extends transversely completely across the link body 25c. The innermost layer 45 is stiff relative to the outermost layer 40. The elastomeric layers and shims 40–45 are shaped so that their focal point $F_p$ is coincident with the longitudinal axis of the attachment sleeve means 50b so that rotation of the attachment sleeve means 50b relative to the focal point $F_p$ stresses the elastomeric layers substantially entirely in shear while movement of the attachment sleeve means 50b relative to the trailing end 25b of the link stresses the elastomeric layers substantially entirely in compression.

As best seen in FIG. 7, the attachment sleeve means 50b includes a series of internal splines 51 or keyways which matingly engage a splined pin or key 52 secured by the attachment bolt 34 between link mounting clevises, such as illustrated in FIGS. 3 and 3A. It is highly desirable for the clevises and the connecting bolts, such as the bolts 33 and 34 to be arranged in the manner illustrated, i.e. disposed transverse to the rotational axes of the shafts 12 and 13, i.e. substantially radially with respect thereto, in order to prevent the sleeve from cocking in the elastomeric bearings, as such action shortens bearing life and is undesirable in those applications requiring maximum service life.

When thus secured, movement of the trailing end 25b of the link 25 axially upward, such as illustrated in FIG. 4A, causes the elastomeric layers in each bearing to shear between their associated bonded metal surfaces. Simultaneously, tension in the rightward direction on the link body 25c, such as caused by driving loads on the link, causes the various elastomeric layers to be compressed between the attachment sleeve 50b and the inner surface 25' of the trailing end 25b of the link 25. Moreover, the aforementioned change in distance between the link mounting bolts is accommodated by alternating compression of each elastomeric bearing axially of the link. As a result, the elastomeric layers are subjected substantially entirely to compression and shear loads in the course of operation of the coupling 11.

In the four link coupling illustrated in FIG. 3, the constant velocity relation is ensured by the cyclic resilient deformations of the elastomeric bearings. For instance, the maximum stretching required of each link, such as the leftwardmost link illustrated in FIG. 4 with the shaft misalignment angle $a$ in the plane of the sheet of FIG. 4, occurs when the link is located to either side of the rotational axes of the shafts, i.e. such as when in the foreground in FIG. 4A. The diametrically opposite link (not shown, but behind the link in FIG. 4A) is also subjected to maximum stretching. Simultaneously, the other two diametrically opposite links are subjected to maximum compression. The net effect of these conditions is that the compressive forces caused by link stretching is balanced by tensile forces caused by link foreshortening. These forces are superimposed on the normal tensile loads on the links caused by torque transmission. However, as the net torque on the driven shaft caused by link stretching and contraction is substantially zero, a constant velocity relation is maintained between the shafts.

Figure 5:
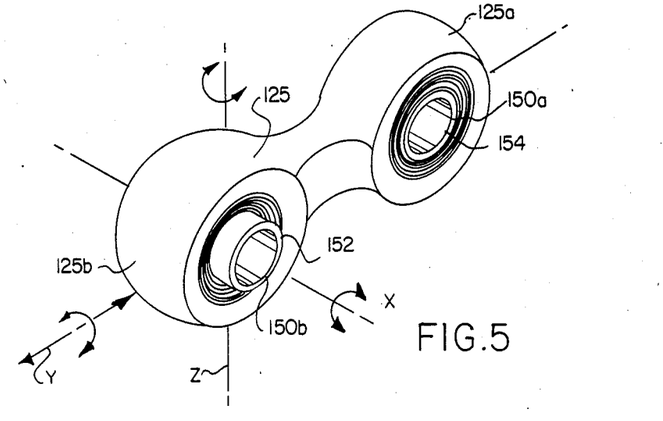
FIG. 5 is a perspective view of a link embodying the present invention, the view illustrating the arrangement of certain relative motions which must be accommodated by the elastomeric bearings at the link ends.

The elastomeric bearings are formed in situ in the ends of each link body. To this end, each link body 25c is fabricated of machined or forged metal or similarly axially, torsionally and flexurally stiff material, and spherical cavities, such as the portion defined by the concave surface 25' in FIG. 5, are machined in each end of the link with the cavity focal point at the point $F_p$ as illustrated in FIG. 7. In like manner, metal shims, such as the shims 43 and 44 are arranged in the cavity with their focal points at the aforementioned location $F_p$. After the spherical cavities are bored in the ends of the link, the center sleeve, shims and elastomeric layers are bonded and cured in place under heat and pressure as well known in the art of fabricating elastomeric bearings. As the cavity which receives the elastomeric bearing is symmetrical with respect to the focal point $F_p$, only a segment thereof is illustrated in FIG. 7.

As well known in the art of designing elastomeric bearings, the layers of non-extensible material, or metal shims, are disposed in spaced parallel relation among the elastomeric layers to reduce bulging of the elastomeric material under compression loads, thereby increasing the stiffness of the assembly. The non-extensible shims do not, however, affect significantly the stiffness of the assembly in shear, and so do not affect significantly the torsional resilience of the bearing with respect to its attachment focal point $F_p$. Accordingly, the thus-described link is relatively torsionally flexible about mutually perpendicular X, Y and Z axes through the focal point at its ends while being stiff in axial compression and tension.

In order to take full advantage of the aforedescribed link characteristics, the links are mounted between the hubs 15 and 16 in such a manner as to ensure that substantially all relative motion between the link ends is accommodated by shearing and compression of the elastomeric layers composing the elastomeric bearing, such as the layers 40, 42 and 45. By securing the attachment sleeves non-rotatively to their respective drive and driven members, the propensity of the elastomeric layers of the elastomeric bearing to shear readily but to resist compression is well utilized, thereby eliminating sliding motion within the link and eliminating wear and the need for periodic lubrication. In addition, the aforedescribed laminated elastomeric bearings damp vibrations and noise, thereby lessening vibration induced stress and wear. Each bearing also provides flexibility for accommodating slight misfits that may be caused by positional or dimensional tolerance deviations.

Design details of each laminated elastomeric bearing will vary depending upon the intended application of the coupling. For instance, the size, the thickness and the number of layers of elastomeric material, and its shear, and effective compression modulus, will depend on the anticipated torque loads and amount of angular misalignment to be accommodated between the drive and driven members. In certain applications, a low loss type of elastomeric material is preferably utilized to minimize heat build-up and energy loss across the coupling. In addition, the elastomeric material should transfer heat readily out of the link in order to avoid undesirable heat build-up in the elastomeric layers. A preferred elastomeric material includes a blend of a natural rubber and a synthetic rubber, such as polybutadiene. For a more detailed discussion of the factors which should be considered in the design of a suitable elastomeric bearing, reference is made to U.S. Pat. No. 2,752,766 to Wildhaber, to U.S. Pat. No. 2,900,182 to Hinks, and to U.S. Pat. No. 3,679,197 to Schmidt, the disclosures of which are incorporated by reference herein.

Figure 2:
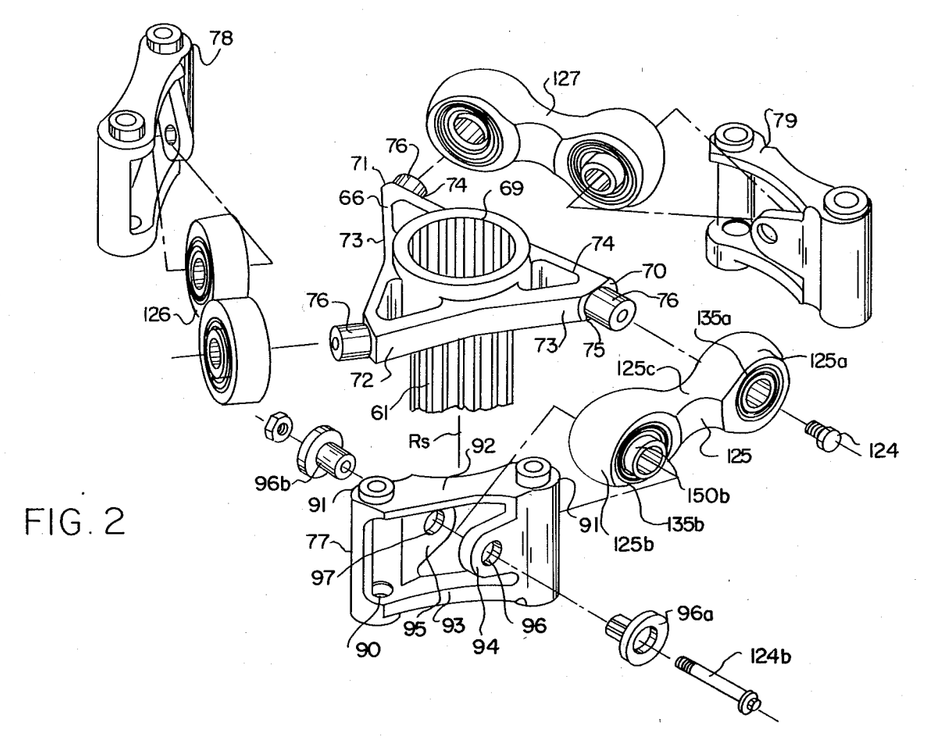
FIG. 2 is an exploded perspective view illustrating various components of the coupling assembly illustrated in FIG. 1.

Having described the present invention in a simplified embodiment for use in connecting misaligned shafts, reference is again made to the embodiment illustrated in FIGS. 1 and 2 wherein the coupling of the present invention is utilized to connect a rotor system to a power plant drive shaft in an aircraft.

As best seen, in FIGS. 1 and 2, the coupling 4 includes a drive member, or hub, 66 adapted to be connected to a powerplant drive shaft 61, as by the splined bore connection 69 illustrated, or in accordance with other conventional aerospace manufacturing techniques. The drive hub 66 is rotated about the vertical axis $R_s$ by an aircraft powerplant (not shown) connected to the drive shaft 61. As described heretofore, the coupling 4 connects the drive hub 66 to each of the rotor or propeller blades via a driven hub 3 having a plurality of radial arms, such as the arm 2. The coupling 4 permits the hub 3, and hence the blades connected thereto, to rotate about an axis $R_h$ which usually is aligned with the drive shaft rotational axis but which may be misaligned at an angle $\alpha$ of up to about 10 degrees with respect to the rotational axis $R_s$ of the drive hub 66 and powerplant drive shaft.

To this end, the drive hub 66 is of spider form and includes a plurality of generally radially extending spider arms 70, 71 and 72 disposed in a plane orthogonal to the rotational axis $R_s$ of the drive shaft 61. In the illustrated embodiment, three such arms are provided, the arms being equidistant and equiangularly disposed with respect to the splined bore 69 of the drive hub 66. Each arm, such as the arm 70, includes a pair of radially outwardly converging sections 73 and 74 which terminate in an integral annular bearing surface 75. A splined trunnion, or stub shaft, 76 extends outwardly from the bearing surface 75 and has an internally threaded bore for receiving a bolt 124.

The leading end 125a of a link 125 is connected to the splined trunnion 76 by the bolt 124. The trailing end 125b of the link 125 is connected to the driven hub 3 by means of a clevis, or pillow block, 77 secured by a pair of vertical bolts 88 and 89 extending between the root portion 2a of the driven hub arm 2 and an overlying mounting hub 7. Each bolt, such as the trailing end bolt 88 passes downwardly through aligned bored sleeves 90 and 91 in the trailing end of the clevis 77. The clevis 77 includes a pair of fore and aft extending brace members 92 and 93 which connect the mounting bolt sleeves 90 and 91. The leading ends of the braces 92 and 93 are provided with an integral aft extending lateral ear 94, and the trailing end portions of the braces 92 and 93 are provided with a forwardly extending lateral ear 95. The ears 94 and 95 are arranged in substantially parallel relation with one another on opposite sides of a plane orthogonal to the axis of the trunnion 76 and substantially tangent to a radius from the axis of the shaft 61. The clevis ears 94 and 95 are provided with splined bores 96 and 97 which receive similarly splined attachment fittings 96a, 96b having through bores for receiving the trailing end connecting bolt 124b. The trailing end 125b of the link 125 is adapted to be inserted between the clevis ears 94 and 95 and to be secured in place by the splined transverse attachment fittings 96a and 96b which are bolted together by the connecting bolt 124b. Each of the other links 126, 127 is similarly connected to its respective clevis 78 and 79, respectively.

Figure 6:
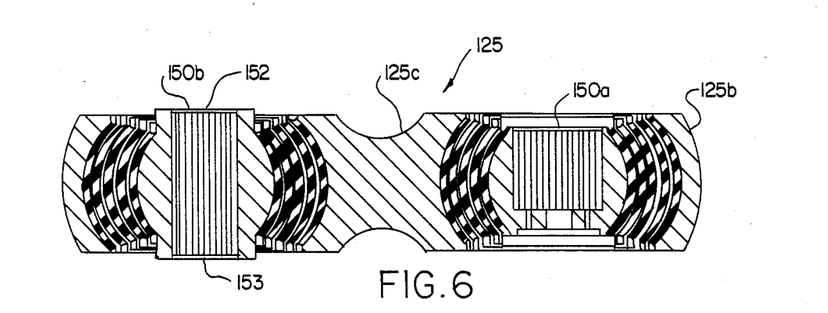
FIG. 6 is an enlarged sectional view illustrating a preferred embodiment of the link of the present invention.

The link 125 is generally similar in construction to the link 25 illustrated and described heretofore. For instance, the link 125 is provided with internally milled spherical cavities in its leading end 125a and in its trailing end 125b. Spherical laminated elastomeric bearings 135a and 135b are mounted within the leading and trailing end cavities, and each includes a plurality of alternating layers of elastomeric material and metal shims bonded together by an adhesive. In addition, each elastomeric bearing includes an internally splined, tubular attachment sleeve, such as the trailing end sleeve 150b which extends transversely of the link body 125c and has a through bore therein. As best seen in FIGS. 5, 6 and 7, the trailing end attachment sleeve 150b has axial end portions 152, 153 that extend laterally outward beyond the opposite longitudinal end faces of the link body 125c. The sleeve end portions 152, 153 cooperate with the clevis ears 94, 95 to center the trailing end of the link 125 therebetween and to provide the clearances necessary to enable the link to pivot about its longitudinal axis. The leading end attachment sleeve 150a may have a bored end wall 154 (FIG. 5) adapted to engage the end of the stub shaft 76 and to be fastened thereto by the connecting bolt 124a.

The various alternating layers of elastomeric material and metal are bonded together and to the link body 25c and the attachment sleeves 150a, 150b in the manner discussed heretofore. The internally splined attachment sleeve 150b of the trailing end bearing is adapted to receive the complementary attachment fittings 96a and 96b when engaged with their respective splined clevis bores 96 and 97, respectively, thereby causing the attachment sleeve 150b to be non-rotatively secured in its mounting clevis 77. The elastomeric bearing 135a provided at the leading end 125a of the link 125 is of generally the same construction as the trailing end bearing 135b, having an internally splined attachment sleeve 150a adapted to matingly engage the splined driven hub trunnion 76 and to be captively and non-rotatively secured thereto by the connecting bolt 124a. With this construction, each end of the link 125, such as the trailing end 125b, is capable of being resiliently pivotally displaced about mutually perpendicular X, Y and Z axes passing through the focal point $F_p$, such as in the directions illustrated by the arrows in FIG. 5, when connected in the coupling 4 as illustrated and the coupling rotated. Simultaneously with accommodating such motion, each link is capable of accepting axial loads imposed along its Y axis in the direction indicated by the arrows, whether such loads be of a tensile or compressive nature.

In the aircraft rotor mounting application illustrated in FIG. 1, operation of the coupling 4 is similar to the operation of the coupling 11 of the embodiments of FIGS. 3 and 4. In the coupling 4, however, up to one million pound inches of torque must be transferred from the drive shaft to each rotor while operating with angular misalignments that may vary up to about 10 degrees at rotational speeds of about 400 revolutions per minute. This requires that each link carry up to 41,500 pounds steady state tensile load plus alternating tensile and compressive loads of 14,000 pounds at 13 cycles per second. Moreover, each link must carry such loads for various time periods for up to 2500 total hours of operation. The coupling of the present invention meets the aforementioned requirements.

By way of example, and not by way of limitation, a preferred coupling of the present invention designed for use in the aforedescribed aircraft application has a link 125 formed of titanium with enlarged bulbous leading and trailing end portions 125a, 125b at opposite ends of its rigid, axially and torsionally stiff body 125c. Each elastomeric bearing mounted in the link preferably includes at least about six spherical metal shims, each about 0.030 inches thick, separated a uniform distance of about 0.10 inches from one another by layers of elastomeric material of uniform thickness bonded thereto by an appropriate rubber metal adhesive, such as Chemlok TF-1677-44, sold by Lord Corporation of Erie, Pa. The metal shims, and their alternating elastomeric layers, have their respective radii of curvature centered at the focal point $F_p$. Preferably, each metal shim is formed of stainless steel and has portions extending beyond the side edges of the elastomeric layers to provide cooling fins, such as the fins 43a, 44a, which are helpful in dissipating heat generated among the elastomeric layers in the course of operation of the coupling. The confronting edges of the metal shims of each spherical elastomeric bearing are juxtaposed and are located diametrically opposite one another with respect to the transverse axis X of the link 125 with the gaps between the edges of the shims being offset angularly with respect to the gaps in the immediately adjacent shim layer. Preferably, each focal point $F_p$ is located on the transverse link axis X which passes through the centers of the attachment sleeves 150a, 150b.

The elastomeric material which bonds the metal shims to one another and to the link and attachment sleeve is a blend of elastomers as discussed earlier. Preferably, however, the properties of the elastomeric material blend are adjusted so as to be uniform within each layer but non-uniform from layer to layer. For example, the radially innermost layer 45 of each elastomeric bearing is relatively stiff, while the radially outermost layer 40 is soft relative to the innermost layer 45. The properties of the layers in between these layers may be varied, but are generally in a range between these limits. For example, the relatively stiff innermost layer 45 should have an effective compression modulus of 80,000 psi., and a shear modulus of 260 psi. The relatively soft outermost layer 40 should have an effective compression modulus of 40,000 psi., and a shear modulus of 160 psi. Thus, the outermost layer 40 has an effective compression modulus which is about 50% that of the innermost layer 45. The intermediate layers may have corresponding values within these ranges. In heavy duty applications, such as the rotor mounting application illustrated, each layer preferably has a low loss factor, or tan delta, of less than 0.10, and preferably close to about 0.05. However, depending on a variety of design considerations, elastomeric materials of higher loss factors, up to about 0.50 may be utilized. Preferably, the aforementioned elastomeric properties are provided by a blend of natural rubber and synthetic rubber, such as polybutadiene, wherein the natural rubber comprises in a range of about 50 percent to about 90 percent of the total weight of the blend and the synthetic rubber comprises in a range of about 50 percent to about 10 percent of the total weight of the blend. Such a blend can be bonded readily by adhesives to the various metallic surfaces of the link and shims during in situ formation under heat and pressure.

With an axial spacing of about 7.2 inches between bearing focal points $F_p$ (FIG. 6) the aforementioned construction of each link 125 permits each end of the link to rotate relative to its attachment sleeve about its transverse axis X (FIG. 5) through a total arc of about 9.7 degrees at the leading end and 14 degrees at the trailing end, to rotate about its longitudinal axis Y through a total arc of about 5 degrees, and to rotate about the Z axis through a total arc of less than about 2 degrees. Moreover, the configuration of each elastomeric bearing is such as to enable these angular displacements to occur cyclically while the link is subjected to axial tensile loads along its longitudinal Y axis and to periodic compressive loads in the opposite direction along the same axis. The disposition of the elastomeric bearing attachment sleeves transversely with respect to the rotational axis of the members to which they are connected permits the trailing end of each link to oscillate substantially freely with respect to a plane orthogonal to the rotational axis of the drive shaft. Failure to provide such freedom of movement, as by constraining the trailing end of the link by disposing its attachment sleeve axis 90 degrees with respect to the direction illustrated, requires the sleeve to undergo a cyclic cocking motion, and this can reduce the life of the elastomeric bearing, and hence the overall service life of the link. Accordingly, it is highly desirable for the link 125 to be mounted in a coupling in the manner illustrated in FIG. 1 to avoid creating undesirable stresses within the elastomeric bearings at the ends of the link.

In view of the foregoing, it should be apparent that the present invention now provides an improved coupling for connecting a drive shaft to a driven member in a manner permitting the driven member to rotate about an axis which is misaligned with respect to the rotational axis of the drive shaft. The coupling of the present invention may be used in a variety of applications, such as coupling misaligned drive shafts, or coupling a rotor hub to a drive shaft in an aircraft. The coupling of the present invention provides a highly desirable constant velocity connection between the drive and driven members, thereby avoiding the development of undesirable stresses and vibrations in the connected system. Moreover, the link components of the coupling are sufficiently rugged as to meet the aforementioned requirements but are of sufficiently simple construction as to be manufactured readily using available aerospace manufacturing technologies.

While preferred embodiments of the present invention have been described in detail, various modifications, alteration and changes may be made without departing from the spirit and scope of the present invention as defined in the appended claims.

I claim:

1. In a link coupling for transmitting torque between rotatable drive and driven members while accommodating angular misalignment between their rotational axes, said link coupling including a plurality of links and attachment means for interconnecting the links to the drive and driven members so that the links can move independently as they advance tangentially about said axes, the improvement wherein each link comprises:

axially stiff body means for accepting both tensile and compressive loads applied tangentially between said drive and driven members, first laminated elastomeric bearing means cooperable with one of said attachment means for connecting a first end of said body means to said drive member to permit the body means to pivot about a first axis while undergoing elastic compression during application of tension to said body means, second laminated elastomeric bearing means cooperable with another of said attachment means for connecting a second end of said body means to said driven member to permit pivotal movement of the body means about a second axis parallel to said first-mentioned axis, said first and second laminated elastomeric bearing means also permitting pivotal movement of the body means about a third axis extending lengthwise of the body means between said first and second axes, said laminated elastomeric bearing means cooperable with said attachment means for enabling said laminated elastomeric bearing means to undergo elastic shearing during said pivotal motion about said axes and to undergo elastic compression when said body means is subjected to tension while rotating about misaligned axes, whereby the link motion necessary to effect a substantially constant velocity connection between misaligned rotatable drive and driven members can be accommodated.

2. A link coupling according to claim 1 wherein said first and second laminated elastomeric bearing means cooperate with their respective attachment means to permit pivotal motion of the body means about both of said first and second axes without causing a cocking motion of the attachment means with respect to said body means when the drive and driven members rotate about misaligned axes.

3. A link coupling according to claim 2 wherein said first and second axes extend in a generally radial direction transverse to said rotational axes, and said laminated elastomeric bearing means are of like spherical construction and cooperate with their respective attachment means to permit said relative pivotal motion of the body means to occur about each of said aforementioned first, second and third axes.

4. A link coupling according to claim 3 wherein each of said first and second laminated elastomeric bearing means includes a plurality of convex layers of alternating elastomeric material and non-extensible material bonded together and mounted in said body means with their focal points coinciding substantially with said first and second axes.

5. A link coupling according to claim 4 wherein each laminated elastomeric bearing means includes means extending transverse to said body means for cooperating with said attachment means to provide a non-pivotal relative connection of both of said laminated elastomeric bearing means to said drive and driven means on said first and second transverse axes.

6. A link coupling according to claim 4 wherein said link body is torsionally and flexurally stiff between said laminated elastomeric bearing means so that said laminated elastomeric bearing means cooperate with said attachment means to mount said link for said pivotal movement about intersecting, perpendicular X, Y and Z axes at each end of the link with said Y axis extending lengthwise of said body means.

7. A link coupling according to claim 4 wherein said laminated elastomeric bearing means includes means defining a concave surface at each end in said body means, and said elastomeric material is bonded both to said concave surface and to said attachment means with said alternating layers being arranged in substantially parallel relation therebetween.

8. A link coupling according to claim 4 wherein said elastomeric material includes a blend of natural and synthetic elastomers having an effective compression modulus in a range of about 40,000 psi. to about 80,000 psi., and a shear modulus in a range of about 160 psi. to about 260 psi., and a tan delta loss factor of less than about 0.50.

9. A link coupling according to claim 4 wherein said elastomeric material has a shear modulus that varies among said layers with the maximum shear modulus being located in the layer adjacent said attachment means and the minimum shear modulus being located in the layer adjacent to said body means.

10. A link for use in connecting drive and driven members in a coupling capable of transferring torque between the members when rotated about axes that may be angularly misaligned with one another comprising: a connecting element having a leading end portion and a trailing end portion, said connecting element being axially, flexurally an torsionally stiff with respect to its leading and trailing end portions, a laminated elastomeric bearing mounted at each end of said connecting element, each laminated elastomeric bearing including a mounting attachment means extending transverse to said connecting element for effecting a non-rotative relative connection to its associated drive or driven member and a plurality of convex alternating elastic and relatively non-extensible layers bonded together and to said mounting attachment means and connecting element, said layers permitting said mounting attachment means to pivot orthogonal intersecting axes relative to each end portion of said connecting element at least one of which axes extends longitudinally of the link and to deflect longitudinally of the link, both said pivotal and longitudinal motions occurring without sliding of the mounting attachment means with respect to the connecting element, whereby the link can accept loads applied in either axial direction while accommodating among the plurality of elastic layers axial and pivotal relative movement of the connecting element with respect to the mounting attachment means.

11. A link according to claim 10 wherein said laminated elastomeric bearing layers at each end of said connecting element have their focal points located between the leading and trailing ends of the link on its longitudinal axis, and each of said mounting attachment means extends transversely of the connecting element and through said focal points.

12. A link according to claim 10 wherein each laminated elastomeric bearing is spherical and is arranged with its focal point at a location substantially coincident with the mounting attachment means.

13. A link according to claim 10 wherein said connecting element includes a concave inner surface defining a cavity surrounding said attachment means, and said layers are bonded between said surface and said attachment means.

14. A link according to claim 10 wherein said relatively non-extensible layers of said laminated elastomeric bearing include a plurality of metal shims bonded to and between said elastic layers.

15. A link according to claim 10 wherein the elastic layers are substantially uniform in thickness, and the elastic is softer adjacent to the connecting element than adjacent to the attachment means.

16. A link according to claim 10 wherein said elastic layers include a blend of natural and synthetic elastomers cured in situ within said connecting element.

17. A link according to claim 10 wherein said elastic layers, when cured, have an effective compression modulus in a range of about 40,000 psi. to about 80,000 psi., a shear modulus of about 160 psi to about 260 psi., and a tan delta loss factor of less than about 0.010.

18. A link according to claim 10 wherein said non-extensible layers are of metal and have portions extending laterally of said connecting element beyond the elastic layers therebetween to provide cooling fins.

19. A link according to claim 10 wherein said mounting attachment means includes a sleeve extending transverse to said connecting element for effecting said relative non-rotative attachment, and said elastic layer adjacent to said sleeve is stiff relative to the elastic layer adjacent to said connecting element.

20. In a link-type coupling for transferring torque between drive and driven members rotatable about misaligned rotational axes, including connectable means located radially outward of their respective rotational axes in spaced confronting relation with one another, and linkage means for connecting said connectable means of said drive and driven members, the improvement wherein said linkage means comprises:
an axially stiff connecting element extending between said connectable means substantially tangentially to said rotational axes;
spherical laminated elastomeric bearing means mounted at opposite ends of said connecting element, each of said laminated elastomeric bearing means including at least one relatively inextensible layer bonded to and between a pair of elastic layers;
attachment means securing said laminated elastomeric bearing means to said connectable means for causing said elastic layers of said laminated elastomeric bearing means to accept in elastic compression axial forces and deflections of the connection element and for causing said laminated elastomeric bearing means to accommodate in elastic shear the pivotal deflections of the connecting element as it advances endwise about said rotational axes;
whereby a substantially constant velocity rotary connection is provided between the rotatable members.

21. A coupling according to claim 20 wherein said attachment means effects a non-sliding pivotal connection between said connectable means and the elastic layers of said laminated elastomeric bearing means of said connecting element to accommodate both the angular deflection of the connecting element transverse to a plane orthogonal to the rotational axis of the drive means and the torsional deflection of the connecting element with respect to the connectable means.

22. A coupling according to claim 21 wherein said attachment means extends transversely with respect to the rotational axis of the connectable means to which the connecting element is secured for preventing the laminated elastomeric bearing from cocking with respect to the connecting element during operation of the coupling with the rotational axes misaligned.

23. A coupling according to claim 22 wherein said laminated elastomeric bearings at each end of said connecting element are of like construction and said elastic and inelastic layers include a plurality of alternating spherical layers of elastomeric and non-extensible material bonded together and to said link and said attachment means in a manner enabling said pivotal deflections of the attachment means to be accommodated in elastic shear and said axial deflections to be accommodated in elastic compression.

24. A coupling according to claim 23 wherein said elastomeric material includes a blend of natural and synthetic rubbers having, when cured, an effective compression modulus of about 40,000 psi. to about 80,000 psi., a shear modulus of about 130 psi. to about 260 psi., and a loss factor tan delta of less than 0.50.

25. A coupling according to claim 23 wherein said laminated elastomeric bearings are bonded to said connecting element within a spherical cavity formed integral therein and have focal points, and said attachment means includes an attachment sleeve surrounding the focal point of each laminated elastomeric bearing and bonded thereto.

26. A coupling according to claim 23 wherein the attachment means extends transversely through said connecting element form one side thereof to the other and substantially radially of the rotational axes of the drive and driven members.

27. In an aircraft having a powerplant with a drive shaft and a rotor hub coupled to the drive shaft for rotation therewith about an axis that may be angularly misaligned with respect to the rotational axis of the drive shaft, the rotor hub being drivingly connected to the drive shaft by a link-type coupling having drive means connected to the drive shaft for rotating in a plane orthogonal thereto and having linkage means arranged generally tangentially of said drive shaft axis radially outward thereof for interconnecting the drive means and hub, the improvement wherein said linkage means comprises a plurality of axially stiff links having leading end portions operatively connected to said drive means and trailing end portions operatively connected to said driven hub, laminated elastomeric bearing means mounted in each end portion of each link, and attachment means for connecting said laminated elastomeric bearing means to said drive means and to said hub, said laminated elastomeric bearing means in at least one end of each link cooperable with its associated attachment means during rotation of the drive shaft both to provide a non-sliding elastic shear connection permitting the link to deflect both about its longitudinal axis and about an axis transverse to the rotational axes of the drive and driven means, said laminated elastomeric bearing means also providing an elastic compression connection for transferring link tension to the attachment means and accommodating relative motion between the drive and driven means, whereby a substantially constant velocity drive connection is provided between the powerplant drive shaft and rotor hub.

28. A coupling according to claim 27 wherein at least said trailing end link attachment means provides said axis extending transversely with respect to the rotational axis of said rotor hub.

29. A coupling according to claim 28 wherein both leading and trailing end attachment means have axes extending in parallel relation transversely in a generally radial direction with respect to the rotational axes of their respectively connected rotor hub and shaft drive means.

30. A coupling according to claim 29 wherein said laminated elastomeric bearing means in at least said trailing end portion of said link includes a spherical component including a plurality of alternating convex layers of elastic and relatively inelastic material bonded together and to said link and its attachment means with the focal point of the layers being disposed inward of the link end.

31. A coupling according to claim 30 wherein the laminated elastomeric bearing means at both ends of the link are of like construction and each elastomeric bearing means is disposed with its focal point at a common location on the longitudinal axis of the link and on the axis its associated attachment means.

32. A coupling according to claim 31 wherein said attachment means connects each laminated elastomeric bearing means non-rotatively with respect to the shaft drive means and the hub and connects the link thereto for pivotal motion about three intersecting mutually perpendicular axes passing through the attachment means with one of the axes disposed lengthwise of the link.

* * * * *